(12) United States Patent
Oshio (10) Patent No.: US 6,531,792 B2
(45) Date of Patent: Mar. 11, 2003

(54) DC-DC CONVERTER AND STORAGE APPARATUS

(75) Inventor: Umeo Oshio, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/922,035

(22) Filed: Aug. 3, 2001

(65) Prior Publication Data

US 2002/0145413 A1 Oct. 10, 2002

(30) Foreign Application Priority Data

Apr. 10, 2001 (JP) .................................... 2001-111913

(51) Int. Cl.[7] ............................. H02M 3/06; H02M 3/18
(52) U.S. Cl. ................................... 307/109; 363/59
(58) Field of Search ........................... 363/59, 60, 62; 327/337, 535, 536; 307/109, 110

(56) References Cited

U.S. PATENT DOCUMENTS 5,825,230 A * 10/1998 Chen et al. ................. 327/337
6,198,645 B1 * 3/2001 Kotowski et al. ............ 363/59
6,304,007 B1 * 10/2001 Yu ............................. 307/110
6,317,343 B1 * 11/2001 Okamura et al. ............ 363/59
6,323,623 B1 * 11/2001 Someya et al. ............. 320/166

FOREIGN PATENT DOCUMENTS

| JP | 05336734 A | 12/1993 |
|----|------------|---------|
| JP | 09135567 A | 5/1997  |

* cited by examiner

Primary Examiner—Matthew Nguyen
(74) Attorney, Agent, or Firm—Greer, Burns & Crain, Ltd.

(57) ABSTRACT

A DC-DC converter includes N capacitors having identical capacitances, initially coupled in series, and supplied with an external power supply voltage to be charged thereby, and an circuit for coupling the N capacitors in parallel and varying a duty ratio of a charging timing, so as to vary an internal power supply voltage which is output from the DC-DC converter.

14 Claims, 8 Drawing Sheets

FIG. 1

PRIOR ART

DC-DC CONVERTER AND STORAGE APPARATUS

BACKGROUND OF THE INVENTION

This application claims the benefit of a Japanese Patent Application No.2001-111913 filed Apr. 10, 2001, in the Japanese Patent Office, the disclosure of which is hereby incorporated by reference.

1. Field of the Invention

The present invention generally relates to DC-DC converters and storage apparatuses, and more particularly to a DC-DC converter which is suited for reducing power consumption of an apparatus, and to a storage apparatus which is provided with such a DC-DC converter.

A disk unit, such as a magnetic disk unit, can be used as a storage apparatus of a host unit such as a personal computer. Recently, there are increased demands to increase the processing speed and to reduce the power consumption of the disk unit. The reduction of the power consumption of the disk unit is important particularly when the disk unit is used as the storage apparatus of a portable personal computer which is driven by a battery.

2. Description of the Related Art

Among various kinds of large scale integrated (LSI) circuits provided within the disk unit, some LSI circuits use mutually different external power supply voltages in order to bring out respective performances to a maximum. For example, there are LSI circuits which use power supply voltages of 2.6 V, 2.5 V, 1.8 V, 1.5 V or the like.

Figure 1:
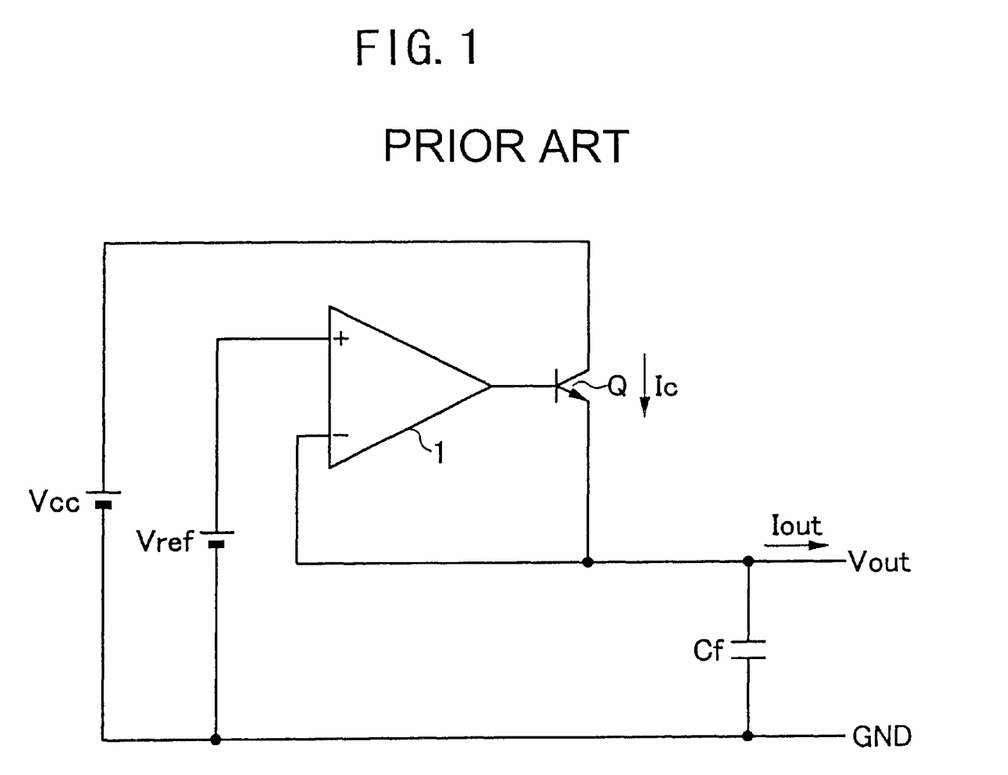
FIG. 1 is a circuit diagram showing an example of a conventional DC-DC converter.

FIG. 1 is a circuit diagram showing an example of a conventional DC-DC converter. The DC-DC converter includes an operational amplifier 1, a transistor Q, and a capacitor Cf which are connected as shown in FIG. 1. Vcc denotes an external power supply voltage, Vref denotes a reference voltage, Vout denotes an internal power supply voltage after conversion supplied to an LSI circuit or the like, and GND denotes the ground.

A power P consumed by the transistor Q can be described by P=(Vcc−Vref)×Iout, where Iout denotes an output current, and this power becomes the loss. By reducing the external power supply voltage Vcc supplied to the LSI circuit via the DC-DC converter, it is possible to suppress an increase of the power consumption of the LSI circuit itself, but the current consumption of the LSI circuit increases. For example, in a case where the external power supply voltage Vcc with respect to the LSI circuit having a power consumption Pd of Pd=1 W is Vcc=2.5 V, a current consumption Ic of the LSI circuit via the DC-DC converter becomes Ic=0.4 A from a relationship Pd=Vcc×Ic. On the other hand, in a case where the external power supply voltage Vcc with respect to the LSI circuit is Vcc=5 V, the current consumption Ic of the LSI circuit via the DC-DC converter becomes Ic=0.2 A. Hence, it may be seen that the current consumption Ic of the LSI circuit increases by 0.2 A when the external power supply voltage Vcc decreases by 2.5 V.

Therefore, in the conventional DC-DC converter, the increase of the power consumption of the LSI circuit itself can be suppressed by reducing the external power supply voltage, but the current consumption of the LSI circuit increases. In other words, the conventional DC-DC converter is a series regulator, and there was a problem in that the power consumption of the disk unit as a whole increases as a result.

In order to reduce the power consumption of the disk unit, it is conceivable to supply the external power supply voltage to the LSI circuit via a switching regulator. However, a large spike noise is generated in the internal power supply voltage when the switching regulator is used, to thereby deteriorate the performance of the disk unit. In addition, when a filter or the like is provided to reduce the spike noise, the structure of the disk unit as a whole becomes complex, and the cost of the disk unit is also increased thereby.

SUMMARY OF THE INVENTION

Accordingly, it is a general object of the present invention to provide a novel and useful DC-DC converter and storage apparatus, in which the problems described above are eliminated.

Another and more specific object of the present invention is to provide a DC-DC converter and a storage apparatus, which can supply a low power supply voltage with a high efficiency.

Still another object of the present invention is to provide a DC-DC converter comprising N capacitors having identical capacitances, initially coupled in series, and supplied with an external power supply voltage to be charged thereby, and means for coupling the N capacitors in parallel and varying a duty ratio of a charging timing, so as to vary an internal power supply voltage which is output from the DC-DC converter. According to the DC-DC converter of the present invention, it is possible to supply a low power supply voltage with a high efficiency.

A further object of the present invention is to provide a DC-DC converter comprising N first capacitors having identical capacitances, initially coupled in series, and M second capacitors, initially coupled in parallel to each other and in parallel to the N first capacitors, respectively supplied with an external power supply voltage to be charged thereby, and means for coupling the N first capacitors in parallel to each other, and the M second capacitors in series to each other and in series to the N first capacitors, and varying a duty ratio of a charging timing, so as to vary an internal power supply voltage which is output from the DC-DC converter. According to the DC-DC converter of the present invention, it is possible to supply a low power supply voltage with a high efficiency.

Another object of the present invention is to provide a DC-DC converter comprising switching means for coupling N capacitors having identical capacitances in series in a first connection state and supplying thereto an external power supply voltage to be charged thereby, and for coupling the N capacitors in parallel in a second connection state, and varying means for varying a duty ratio of a charging timing of the N capacitors in the first connection state, so as to output an internal power supply voltage which is variable. According to the DC-DC converter of the present invention, it is possible to supply a low power supply voltage with a high efficiency.

Still another object of the present invention is to provide a DC-DC converter comprising switching means for coupling N first capacitors having identical capacitances in series, and coupling M second capacitors in parallel to each other and in parallel to the N first capacitors in a first connection state, and supplying thereto an external power supply voltage to be charged thereby, and for coupling the N first capacitors in parallel to each other and the M second capacitors in series to each other and in series to the N first capacitors in a second connection state, and varying means for varying a duty ratio of a charging timing of the N first capacitors and the M second capacitors in the first connection state, so as to output an internal power supply voltage which is variable. According to the DC-DC converter of the present invention, it is possible to supply a low power supply voltage with a high efficiency.

A further object of the present invention is to provide a DC-DC converter comprising a switching circuit which couples N capacitors having identical capacitances in series in a first connection state and supplies thereto an external power supply voltage to be charged thereby, and couples the N capacitors in parallel in a second connection state, and a circuit which varies a duty ratio of a charging timing of the N capacitors in the first connection state, so as to output an internal power supply voltage which is variable. According to the DC-DC converter of the present invention, it is possible to supply a low power supply voltage with a high efficiency.

Another object of the present invention is to provide a DC-DC converter comprising a switching circuit which couples N first capacitors having identical capacitances in series, and couples M second capacitors in parallel to each other and in parallel to the N first capacitors in a first connection state, and supplies thereto an external power supply voltage to be charged thereby, and couples the N first capacitors in parallel to each other and the M second capacitors in series to each other and in series to the N first capacitors in a second connection state, and a circuit which varies a duty ratio of a charging timing of the N first capacitors and the M second capacitors in the first connection state, so as to output an internal power supply voltage which is variable. According to the DC-DC converter of the present invention, it is possible to supply a low power supply voltage with a high efficiency.

Still another object of the present invention is to provide a storage apparatus comprising an internal circuit, a storage section, and a DC-DC converter which supplies an internal power supply voltage to the internal circuit, where the DC-DC converter comprises switching means for coupling N capacitors having identical capacitances in series in a first connection state and supplying thereto an external power supply voltage to be charged thereby, and for coupling the N capacitors in parallel in a second connection state, and varying means for varying a duty ratio of a charging timing of the N capacitors in the first connection state, so as to output an internal power supply voltage which is variable. According to the storage apparatus of the present invention, it is possible to supply a low power supply voltage with a high efficiency.

A further object of the present invention is to provide a storage apparatus comprising an internal circuit, a storage section, and a DC-DC converter which supplies an internal power supply voltage to the internal circuit, where the DC-DC converter comprises switching means for coupling N first capacitors having identical capacitances in series, and coupling M second capacitors in parallel to each other and in parallel to the N first capacitors in a first connection state, and supplying thereto an external power supply voltage to be charged thereby, and for coupling the N first capacitors in parallel to each other and the M second capacitors in series to each other and in series to the N first capacitors in a second connection state, and varying means for varying a duty ratio of a charging timing of the N first capacitors and the M second capacitors in the first connection state, so as to output an internal power supply voltage which is variable. According to the storage apparatus of the present invention, it is possible to supply a low power supply voltage with a high efficiency.

Other objects and further features of the present invention will be apparent from the following detailed description when read in conjunction with the accompanying drawings.

DESCRIPTION OF THE PREFERRED EMBODIMENTS

A description will be given of various embodiments of a DC-DC converter according to the present invention and a storage apparatus according to the present invention, by referring to FIG. 2 and the subsequent drawings.

Figure 2:
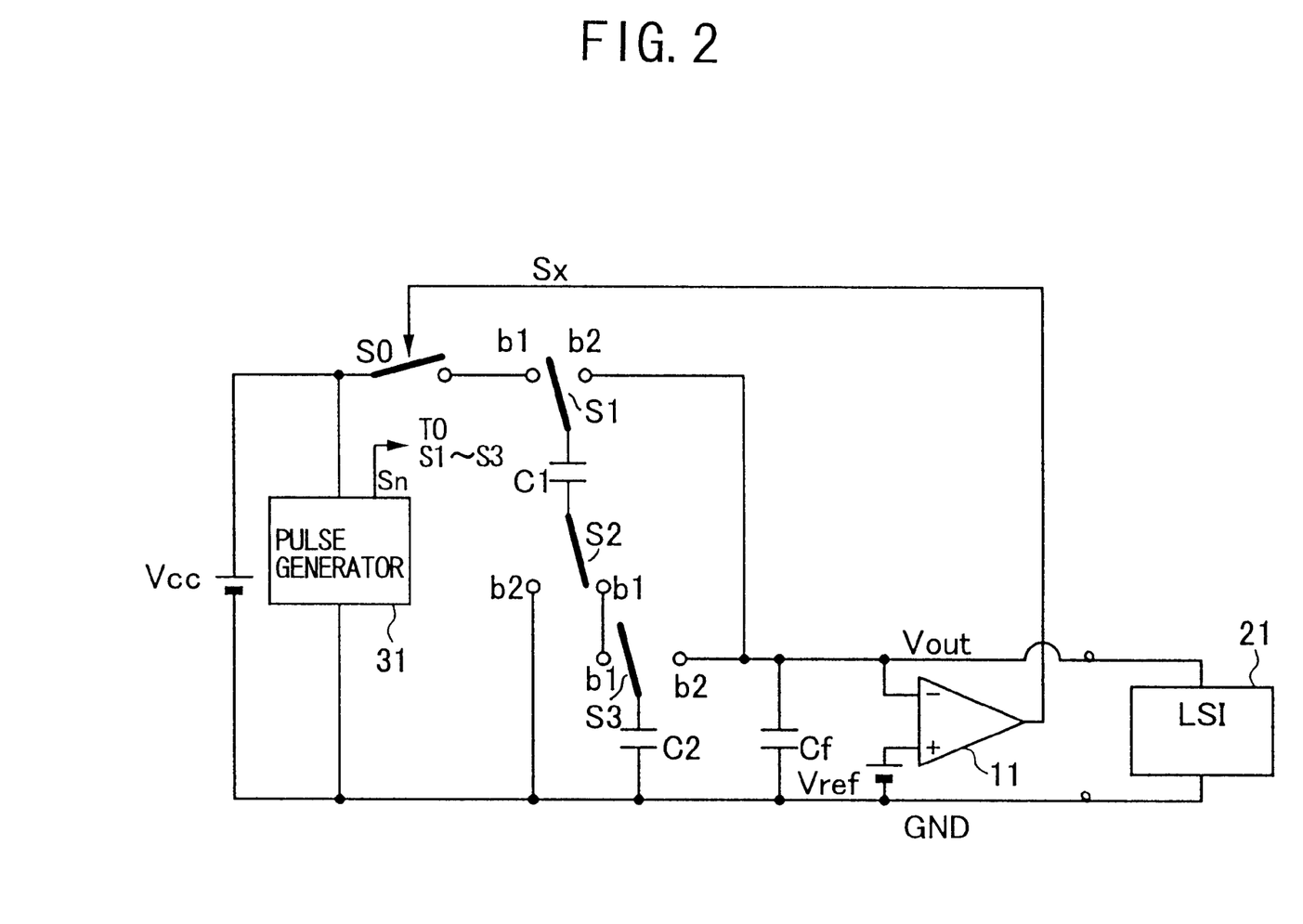
FIG. 2 is a circuit diagram showing a first embodiment of a DC-DC converter according to the present invention.
Figure 3:
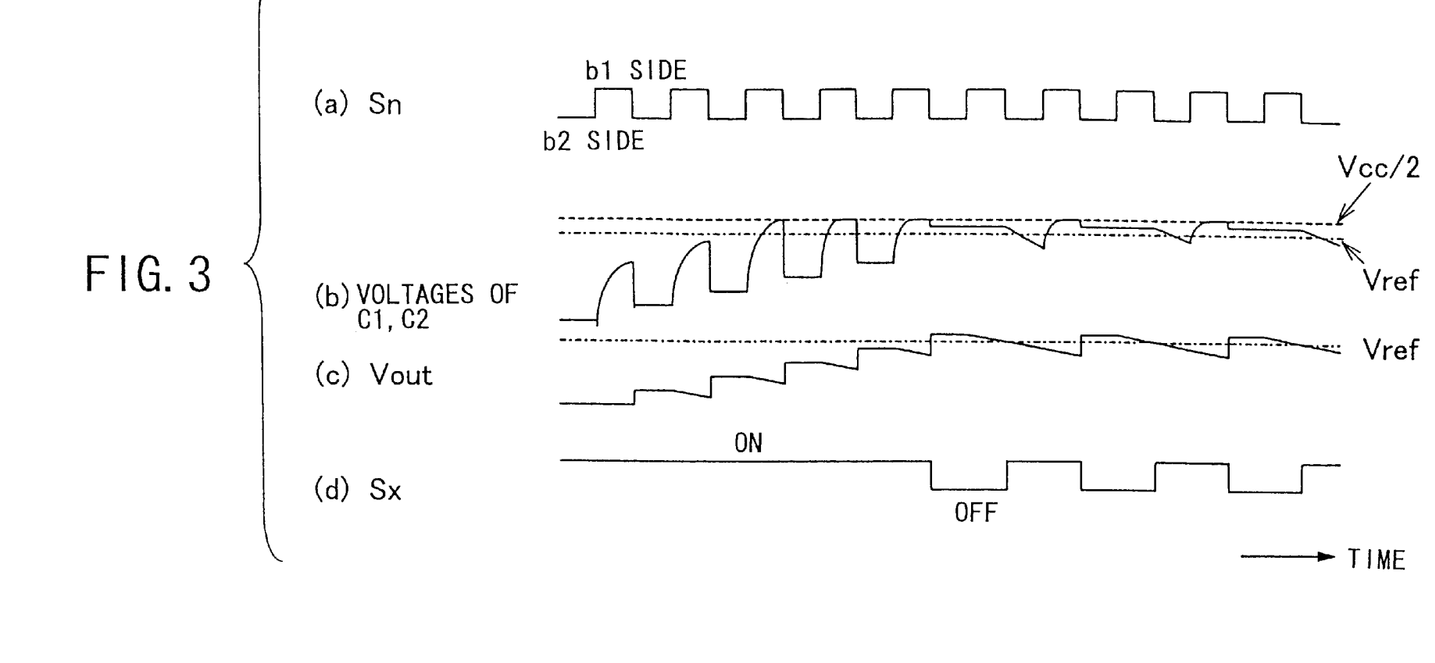
FIG. 3 is a timing chart for explaining an operation of the first embodiment of the DC-DC converter.

FIG. 2 is a circuit diagram showing a first embodiment of the DC-DC converter according to the present invention, and FIG. 3 is a timing chart for explaining an operation of this first embodiment of the DC-DC converter. In FIG. 3, the ordinate indicates a signal amplitude in arbitrary units, and the abscissa indicates time in arbitrary units.

A charge-pump type DC-DC converter includes switches S0 through S3, capacitors C1, C2 and Cf, and a converter 11 having a hysteresis characteristic, which are connected as shown in FIG. 2. Vcc denotes an external power supply voltage, Vref denotes a reference voltage, Vout denotes an internal power supply voltage after conversion supplied to a LSI circuit 21 such as a read/write channel which is provided within a storage apparatus such as a disk unit, and GND denotes the ground. A pulse generator 31 generates a switching pulse Sn for controlling switching of the switches S1 through S3. The pulse generator 31 may be provided outside or inside the DC-DC converter.

In this first embodiment, it is assumed for the sake of convenience that the internal power supply voltage Vout is output by dividing by two the external power supply voltage Vcc. First, the external power supply voltage Vcc is supplied to the DC-DC converter in a state where all of the switches S1 through S3 are connected to respective terminals b1. As a result, if capacitances of the capacitors C1 and C2 are the same, a voltage Vcc/2 is accumulated in each of the capacitors C1 and C2. Next, all of the switches S1 through S3 are switched and connected to respective terminals b2. Consequently, the capacitors C1 and C2 become connected in parallel, and the internal power supply voltage Vout of Vout=Vcc/2 is output. A switching timing of the switches S1 through S3 may be set so that a duty ratio is approximately 50% and a frequency has a value such that the ripple is small. The capacitor Cf functions as a smoothing capacitor for smoothing the internal power supply voltage Vout which is output.

An ON/OFF state of the switch S0 is controlled by an output pulse Sx of the comparator 11. The reference voltage Vref is input to a non-inverting input terminal of the comparator 11, and the internal power supply voltage Vout is input to an inverting input terminal of the comparator 11. When the duty ratio of the output pulse Sx of the comparator 11 becomes large, the ON-time of the switch S0 becomes long, the voltages accumulated in the capacitors C1 and C2 become large, and the internal power supply voltage Vout which is output becomes large. On the other hand, when the duty ratio of the output pulse Sx of the comparator 11 becomes small, the ON-time of the switch S becomes short, the voltages accumulated in the capacitors C1 and C2 become small, and the internal power supply voltage Vout which is output becomes small.

Since the comparator 11 has the hysteresis characteristic, the output pulse Sx assumes a high level when the internal power supply voltage Vout becomes small, so as to turn ON the switch S0 and control the internal power supply voltage Vout to increase. On the other hand, the output pulse Sx assumes a low level when the internal power supply voltage Vout becomes large, so as to turn OFF the switch S0 and control the internal power supply voltage Vout to decrease.

In FIG. 3, (a) shows the switching pulse Sn which is output from the pulse generator 31. Each of the switches S1 through S3 is connected to the terminal b1 during a high-level period of the switching pulse Sn, and is connected to the terminal b2 during a low-level period of the switching pulse Sn. In FIG. 3, (b) shows voltages of the capacitors C1 and C2, with reference to the voltage Vcc/2 which is indicated by a dotted line, and the reference voltage Vref which is indicated by a one-dot chain line. In FIG. 3, (c) shows the internal power supply voltage Vout which is output, and the reference voltage Vref is indicated by a one-dot chain line. Further, in FIG. 3, (d) shows the output pulse Sx of the comparator 11. The switch S0 is turned ON during a high-level period of the output pulse Sx, and is turned OFF during a low-level period of the output pulse Sx. FIG. 3 shows a state from a time when the power of the storage apparatus is turned ON, for example, to a time when the internal power supply voltage Vout which is output stabilizes.

For example, when the frequency of the switching pulse Sn is 500 kHz which is an oscillation frequency of a general switching regulator, the pulse width of the switching pulse Sn becomes 1 μs. Accordingly, when the capacitances of the capacitors C1 and C2 are calculated so that a ripple voltage becomes 0.1 V, the capacitances can be obtained from the following if a current consumption of the LSI circuit 21 is 1 A.

$$C1=C2=Q/V=1 \mu s \times 1(A)/0.1(V)=10 \mu F$$

In this first embodiment, the two capacitors C1 and C2 having the same capacitance are connected in series and the external power supply voltage Vcc is supplied to charge the two capacitors C1 and C2, and the two capacitors C1 and C2 are then connected in parallel and the duty ratio of the charging timing is varied so as to vary the internal power supply voltage Vout which is output. However, the number of capacitors used is of course not limited to two, and it is possible to use N capacitors, where N is an integer greater than or equal to two.

Figure 4:
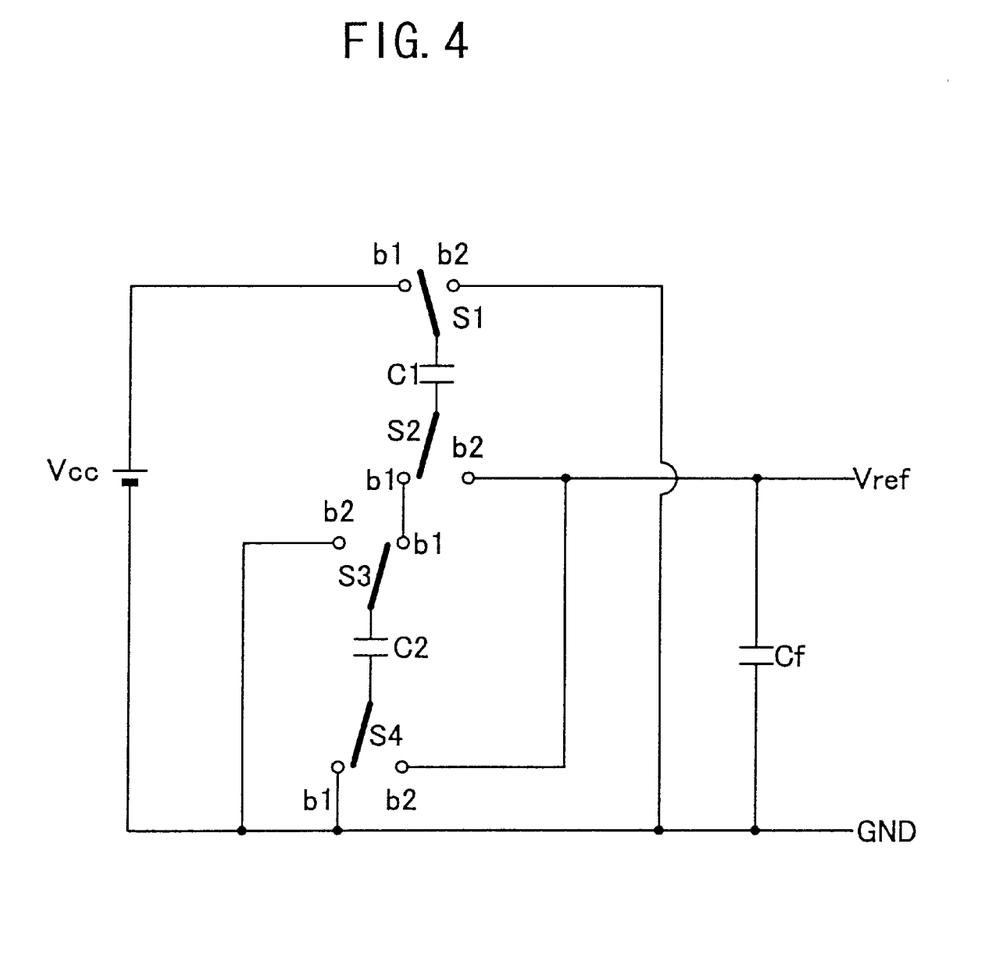
FIG. 4 is a circuit diagram showing a second embodiment of the DC-DC converter according to the present invention.

FIG. 4 is a circuit diagram showing a second embodiment of the DC-DC converter according to the present invention. In FIG. 4, those parts which are the same as those corresponding parts in FIG. 2 are designated by the same reference numerals, and a description thereof will be omitted. Furthermore, the illustration of the comparator 11, the switch S0 and the pulse generator 31 is omitted in FIG. 4.

As shown in FIG. 4, this second embodiment is provided with a switch S4 between the capacitor C2 and the ground GND, and the terminal b2 of the switch S1 is connected to the ground GND. Hence, the polarity of the internal power supply voltage Vout which is output becomes inverted with respect to the polarity of the internal power supply voltage which is output in the first embodiment described above.

Figure 5:
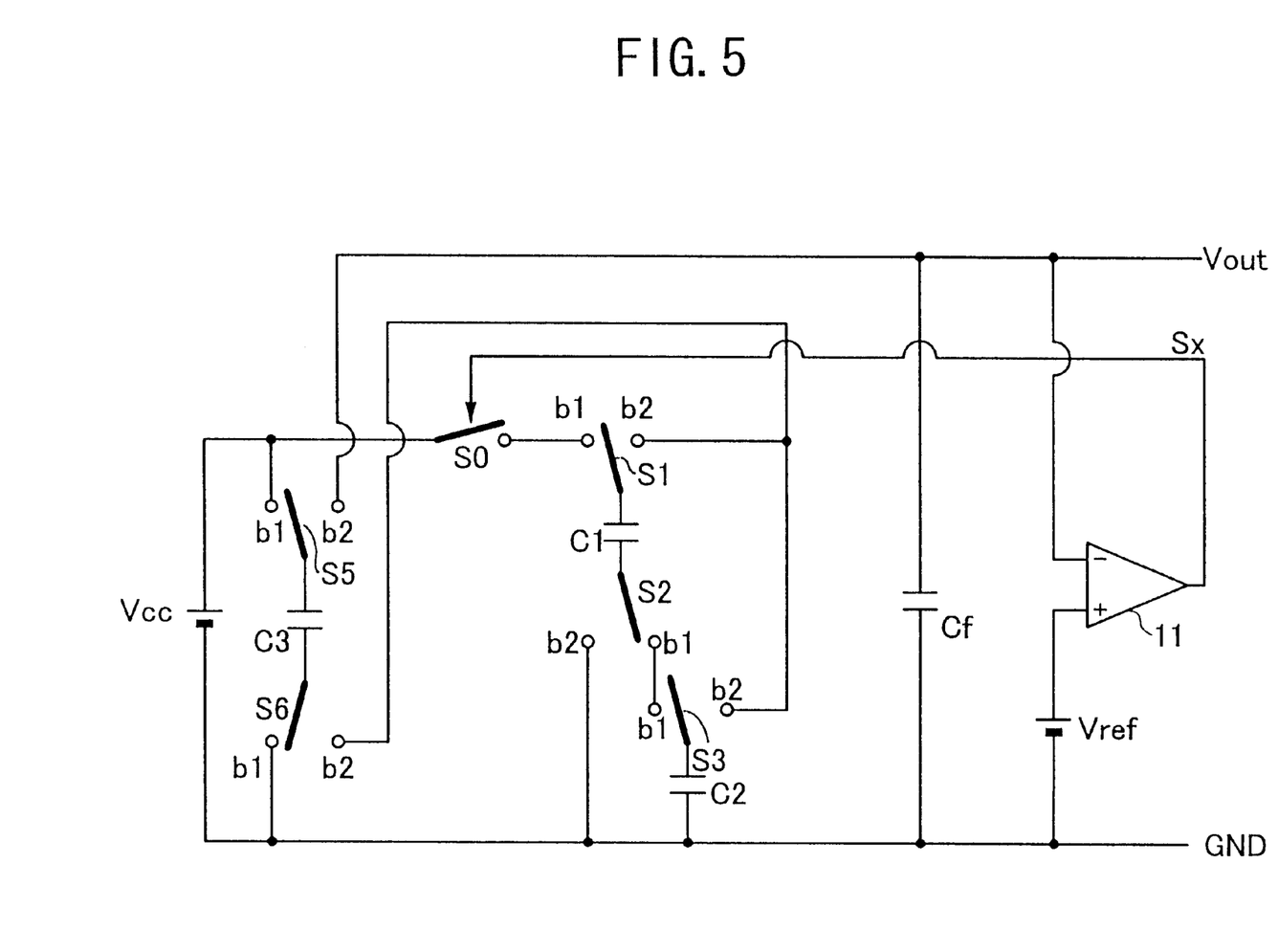
FIG. 5 is a circuit diagram showing a third embodiment of the DC-DC converter according to the present invention.
Figure 6:
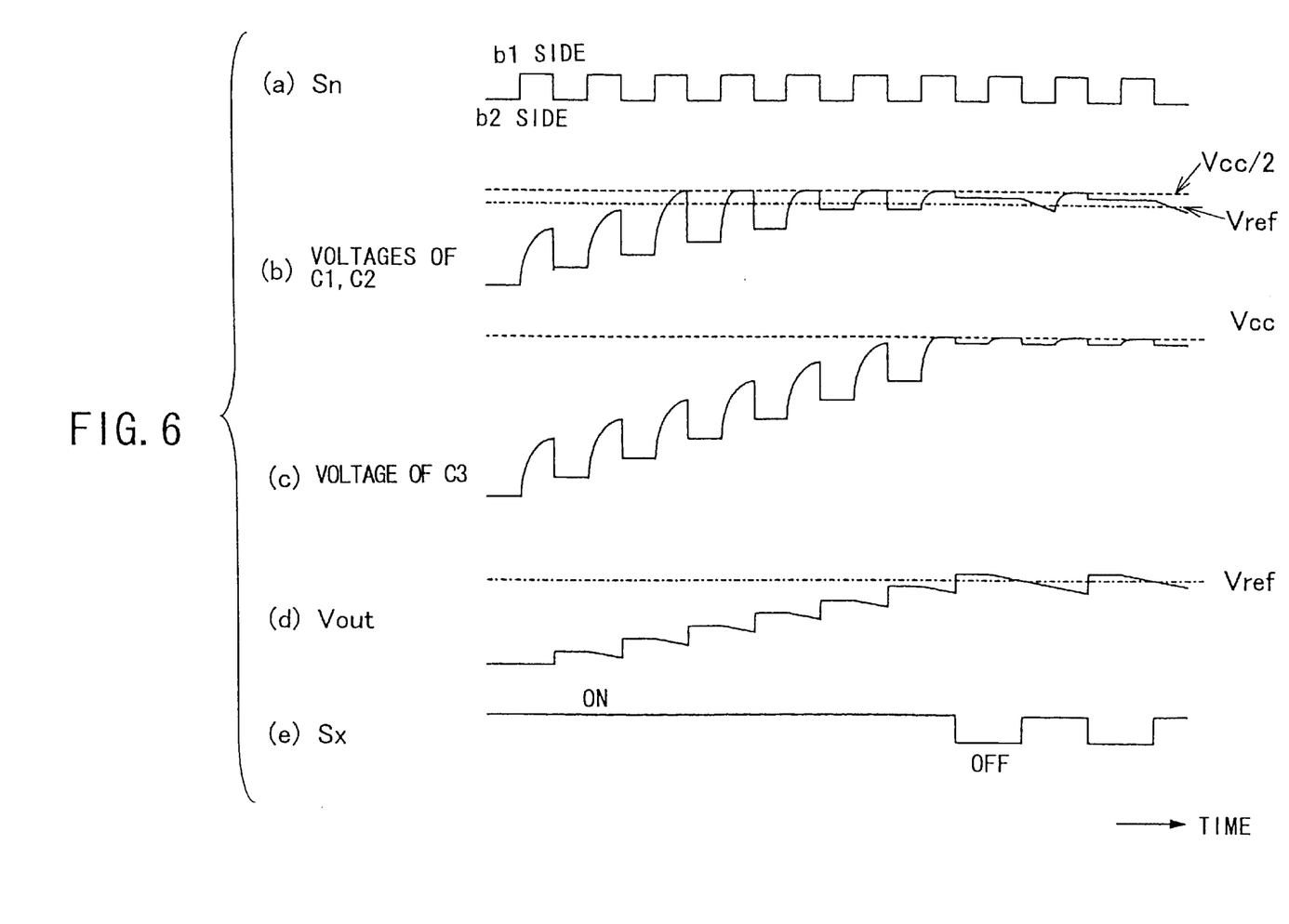
FIG. 6 is a timing chart for explaining an operation of the third embodiment of the DC-DC converter.

FIG. 5 is a circuit diagram showing a third embodiment of the DC-DC converter according to the present invention. In FIG. 5, those parts which are the same as those corresponding parts in FIG. 2 are designated by the same reference numerals, and a description thereof will be omitted. In addition, the illustration of the pulse generator 31 is omitted in FIG. 5. FIG. 6 is a timing chart for explaining an operation of this third embodiment of the DC-DC converter. In FIG. 6, the ordinate indicates the signal amplitude in arbitrary units, and the abscissa indicates the time in arbitrary units.

As shown in FIG. 5, this third embodiment is further provided with switches S5 and S6, and a capacitor C3. Each of the switches S1 through S3, S5 and S6 is connected to the terminal b1 during the high-level period of the switching pulse Sn shown in FIG. 6 (a) which is obtained from the pulse generator 31 (not shown in FIG. 5), and is connected to the terminal b2 during the low-level period of the switching pulse Sn. The switching pulse Sn has a duty ratio of approximately 50%, and a frequency having a value such that the ripple is small.

Hence, the voltages of the capacitors C1 and C2 vary as shown in FIG. 6 (b), and a voltage of the capacitor C3 varies as shown in FIG. 6 (c). In FIG. 6, (b) shows voltages of the capacitors C1 and C2, with reference to the voltage Vcc/2 which is indicated by a dotted line, and the reference voltage Vref which is indicated by a one-dot chain line. In FIG. 6, (c) shows the voltage of the capacitor C3, with reference to the external power supply voltage Vcc which is indicated by a dotted line, and the reference voltage Vref which is indicated by a one-dot chain line. In FIG. 6, (d) shows the internal power supply voltage Vout which is output, and the reference voltage Vref is indicated by a one-dot chain line. Further, in FIG. 6, (e) shows the output pulse Sx of the comparator 11. The switch S0 is turned ON during the high-level period of the output pulse Sx, and is turned OFF during the low-level period of the output pulse Sx. FIG. 6 shows a state from a time when the power of the storage apparatus is turned ON, for example, to a time when the internal power supply voltage Vout which is output stabilizes.

This third embodiment is more suited for a case where a high internal power supply voltage Vout is to be output, when compared to the first embodiment. Further, this third embodiment may employ a structure and a connection similar to those of the second embodiment, so that a high internal power supply voltage Vout is output with a polarity which is inverted with respect to the internal power supply voltage Vout which is output in the first embodiment.

Therefore, according to this third embodiment, the two capacitors C1 and C2 which have the same capacitance and are connected in series and the capacitor C3 which is connected in parallel to the capacitors C1 and C2 are charged by supplying thereto the external power supply voltage Vcc. Next, the parallel-connected capacitor C3 is switched to a series connection, and the series-connected capacitors C1 and C2 are switched to a parallel connection, so that the capacitor C3 becomes connected in series to the capacitors C1 and C2 which are connected in parallel. Furthermore, the duty ratio of the charging timing is varied, so as to vary the internal power supply voltage Vout which is output. However, the number of capacitors having the same capacitance and initially connected in series is of course not limited to two, and N capacitors having the same capacitance may be initially connected in series, where N is an integer greater than or equal to two. Moreover, the number of capacitors initially connected in parallel to the two series-connected capacitors is of course not limited to one, and M capacitors may be initially connected in parallel to each other and in parallel to the two series-connected capacitors, where M is an integer greater than or equal to one.

Figure 7:
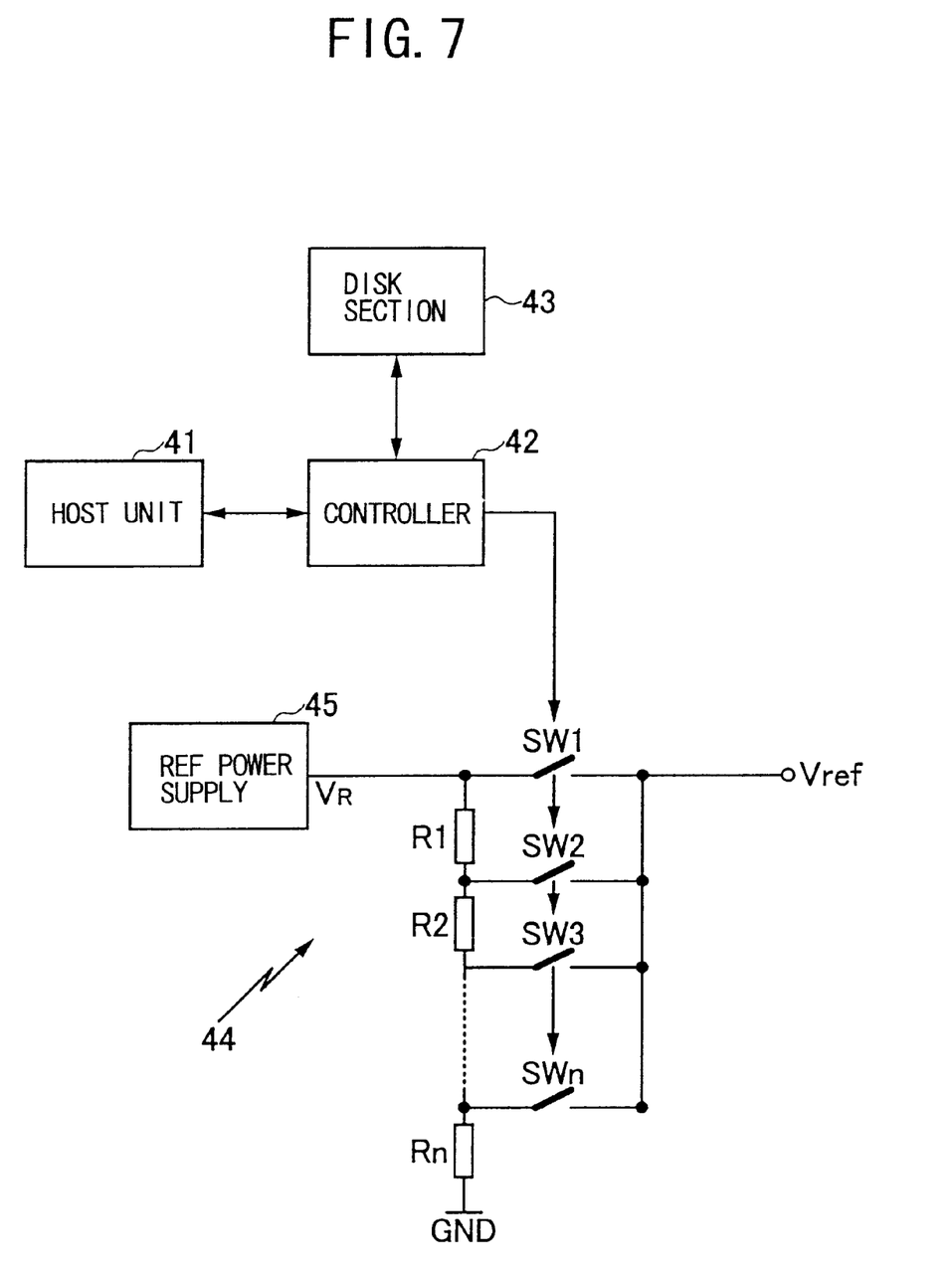
FIG. 7 is a system block diagram showing an embodiment of a storage apparatus according to the present invention.

Next, a description will be given of an embodiment of the storage apparatus according to the present invention, by referring to FIG. 7. FIG. 7 is a system block diagram showing this embodiment of the storage apparatus. In FIG. 7, the illustration of the DC-DC converter is omitted, but the DC-DC converter may have the structure of any one of the first through third embodiments described above. In this embodiment, the present invention is applied to a magnetic disk unit.

The magnetic disk unit shown in FIG. 7 generally includes a controller 42, a disk section 43, and a power supply circuit 44. The controller 42 is made up of one or a plurality of processors or the like, and controls exchange of commands and data between a host unit 41 and the magnetic disk unit. The controller 42 also controls various parts within the magnetic disk unit. The disk section 43 includes one or more heads for recording information on and reproducing information from one or a plurality of magnetic disks, a mechanism for moving the one or more heads, a mechanism for rotating the one or plurality of magnetic disks, and the like. For example, a part formed by the controller 42 and the disk section 43 may be realized by a known structure which includes a hard disk controller (HDC), a micro control unit (MCU), a digital signal processor (DSP), a read/write channel, various driver circuits and the like. The host unit 41 may be made up of a known desk-top or lap-top type personal computer, for example.

The power supply circuit 44 includes a reference power supply 45 for outputting a reference power supply voltage $V_R$, resistors R1 through Rn, and switches SW1 through SWn which are connected as shown in FIG. 7, and generates the reference voltage Vref. The reference voltage Vref is supplied to the non-inverting input terminal of the comparator 11 of the first through third embodiments of the DC-DC converter described above. The ON/OFF state of each of the switches SW1 through SWn is controlled by a control signal which is output from the controller 42.

In the case of the magnetic disk unit employing the zone bit recording, the data transfer is carried out at a high rate when the head is located at the outer peripheral part of the magnetic disk, and the data transfer is carried out at a relatively low rate when the head is located at the inner peripheral part of the magnetic disk. In addition, the LSI circuits such as the HDC and the read/write channel have characteristics which require the external power supply voltage to be increased for the high data transfer rate in order to enable high-speed operation of the internal circuit. However, the operation speed of the internal circuit does not need to be high for the relatively low data transfer rate, and thus, the external power supply voltage does not need to be increased in this case. Hence, in this embodiment, the external power supply voltage is increased to increase the operation speed of the internal circuit for the high data transfer rate, and the external power supply voltage is decreased for the relatively low data transfer rate, so as to realize both high-speed operation and low power consumption in the magnetic disk unit. Particularly in a case where the host unit 41 is made up of a portable apparatus which is driven by a battery, it is desirable to suppress the power consumption as much as possible, and thus, this embodiment is particularly suited for application to a portable apparatus.

Figure 8:
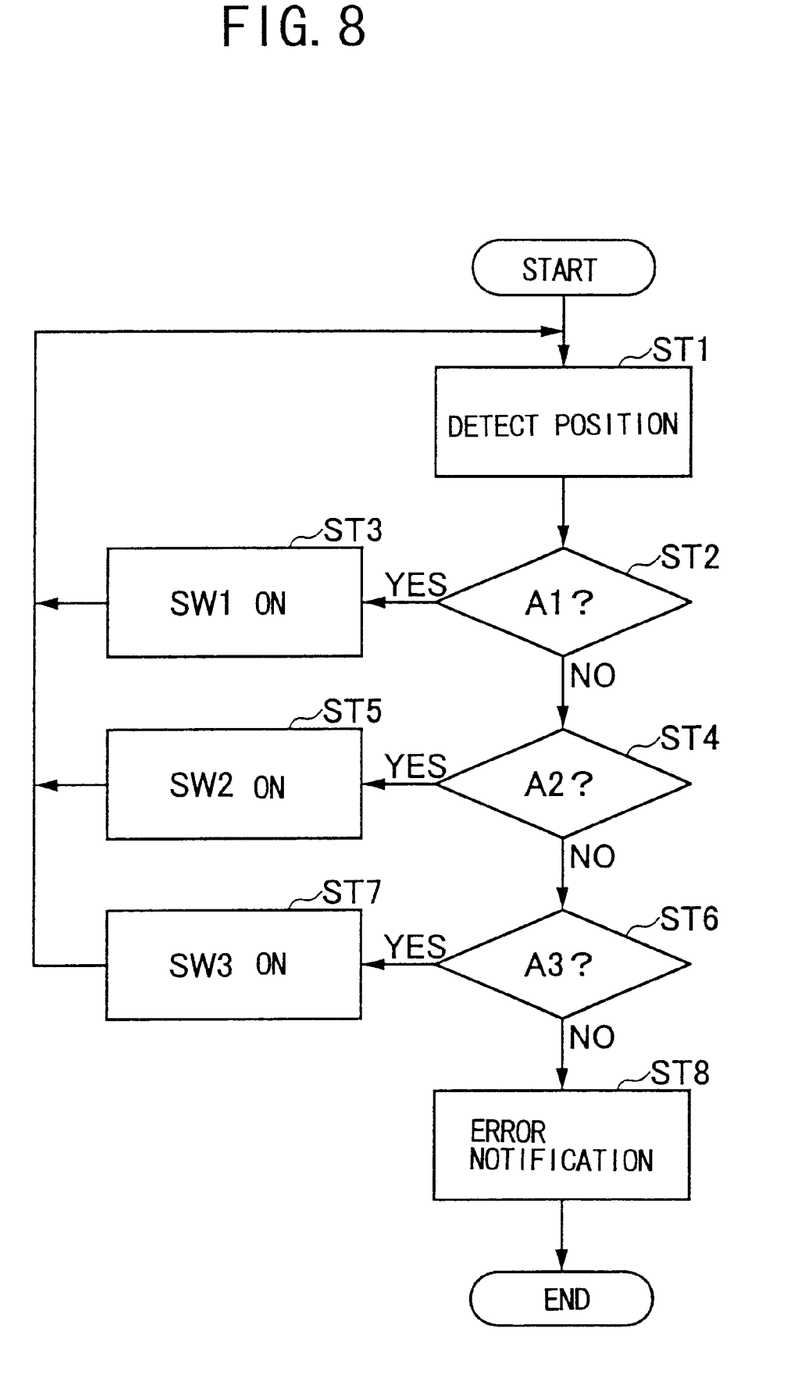
FIG. 8 is a flow chart for explaining an operation of the embodiment of the storage apparatus.

FIG. 8 is a flow chart for explaining an operation of this embodiment of the storage apparatus. The process shown in FIG. 8 is carried out by the controller 42 shown in FIG. 7. For the sake of convenience, it is assumed that a recording region on the magnetic disk is divided into three regions, namely, an outer region A1, an intermediate region A2 and an inner region A3, and that n=3 in FIG. 7.

In FIG. 8, a step ST1 detects a position of the head with respect to the magnetic disk by a known method. A step ST2 decides whether or not the detected position is in the outer region A1. If the decision result in the step ST2 is YES, a step ST3 outputs a control signal for turning ON only the switch SW1, and the process returns to the step ST1. If the decision result in the step ST2 is NO, a step ST4 decides whether or not the detected position is in the intermediate region A2. If the decision result in the step ST4 is YES, a step ST5 outputs a control signal for turning ON only the switch SW2, and the process returns to the step ST1. If the decision result in the step ST4 is NO, a step ST6 decides whether or not the detected position is in the inner region A3. If the decision result in the step ST6 is YES, a step ST7 outputs a control signal for turning ON only the switch SW3, and the process returns to the step ST1. If the decision result in the step ST6 is NO, a step ST8 makes an error notification with respect to the host unit 41, and the process ends.

Hence, it is possible to control the reference voltage Vref to increase as the position on the magnetic disk approaches the outer region A1 on the magnetic disk, and to decrease as the position on the magnetic disk approaches the inner region A3 on the magnetic disk.

In this embodiment, the recording region on the magnetic disk is divided into three regions, and three kinds of reference voltages Vref are generated. However, it is possible to more finely control the operation speed and the power consumption of the LSI circuit by similarly generating four or more kinds of reference voltages Vref. Moreover, it is possible to simplify the control of the reference voltage Vref by generating only two kinds of reference voltages Vref. Even when only two kinds of reference voltages Vref are used, it is possible to sufficiently obtain the effects of realizing both the high-speed operation and the low power consumption of the magnetic disk unit, by increasing the reference voltage Vref for the high data transfer rate so as to increase the operation speed of the LSI circuit, and by decreasing the reference voltage Vref for the relatively low data transfer rate.

Further, the present invention is not limited to these embodiments, but various variations and modifications may be made without departing from the scope of the present invention.

What is claimed is:

1. A DC-DC converter comprising:

switching means for coupling N capacitors having identical capacitances in series in a first connection state and supplying thereto an external power supply voltage to be charged thereby, and for coupling the N capacitors in parallel in a second connection state; and varying means for varying a duty ratio of a charging timing of the N capacitors in the first connection state, so as to output an internal power supply voltage which is variable, wherein said varying means includes a comparator which generates an output pulse by comparing the internal power supply voltage and a reference voltage, and a switch having an ON/OFF state controlled by the output pulse and supplying the external power supply voltage to the N capacitors or to one of the N capacitors.

2. The DC-DC converter as claimed in claim 1, further comprising:
reference voltage generating means for generating the reference voltage.

3. The DC-DC converter as claimed in claim 2, wherein said reference voltage generating means generates a reference voltage which is different depending on a recording and/or reproducing position on a recording medium.

4. The DC-DC converter as claimed in claim 2, wherein said reference voltage generating means generates a reference voltage which is different depending on a data transfer rate of a circuit which is driven by the internal power supply voltage.

5. A DC-DC converter comprising:
switching means for coupling N first capacitors having identical capacitances in series, and coupling M second capacitors in parallel to each other and in parallel to the N first capacitors in a first connection state, and supplying thereto an external power supply voltage to be charged thereby, and for coupling the N first capacitors in parallel to each other and the M second capacitors in series to each other and in series to the N first capacitors in a second connection state; and
varying means for varying a duty ratio of a charging timing of the N first capacitors and the M second capacitors in the first connection state, so as to output an internal power supply voltage which is variable,
wherein said varying means includes a comparator which generates an output pulse by comparing the internal power supply voltage and a reference voltage, and a switch having an ON/OFF state controlled by the output pulse and supplying the external power supply voltage to the N capacitors or to one of the N capacitors.

6. The DC-DC converter as claimed in claim 5, further comprising:
reference voltage generating means for generating the reference voltage.

7. The DC-DC converter as claimed in claim 6, wherein said reference voltage generating means generates a reference voltage which is different depending on a recording and/or reproducing position on a recording medium.

8. The DC-DC converter as claimed in claim 6, wherein said reference voltage generating means generates a reference voltage which is different depending on a data transfer rate of a circuit which is driven by the internal power supply voltage.

9. A storage apparatus comprising:
an internal circuit;
a storage section; and
a DC-DC converter which supplies an internal power supply voltage to said internal circuit,
said DC-DC converter comprising:
switching means for coupling N capacitors having identical capacitances in series in a first connection state and supplying thereto an external power supply voltage to be charged thereby, and for coupling the N capacitors in parallel in a second connection state; and
varying means for varying a duty ratio of a charging timing of the N capacitors in the first connection state, so as to output an internal power supply voltage which is variable,
wherein said varying means of said DC-DC converter includes a comparator which generates an output pulse by comparing the internal power supply voltage and a reference voltage, and a switch having an ON/OFF state controlled by the output pulse and supplying the external power supply voltage to the N capacitors or to one of the N capacitors.

10. The storage apparatus as claimed in claim 9, wherein said storage section includes a head and a recording medium, and said DC-DC converter further comprises reference voltage generating means for generating a reference voltage which is different depending on a recording and/or reproducing position of the head on the recording medium.

11. The storage apparatus as claimed in claim 9, wherein said DC-DC converter further comprises reference voltage generating means for generating a reference voltage which is different depending on a data transfer rate of said internal circuit.

12. A storage apparatus comprising:
an internal circuit;
a storage section; and
a DC-DC converter which supplies an internal power supply voltage to said internal circuit,
said DC-DC converter comprising:
switching means for coupling N first capacitors having identical capacitances in series, and coupling M second capacitors in parallel to each other and in parallel to the N first capacitors in a first connection state, and supplying thereto an external power supply voltage to be charged thereby, and for coupling the N first capacitors in parallel to each other and the M second capacitors in series to each other and in series to the N first capacitors in a second connection state; and
varying means for varying a duty ratio of a charging timing of the N first capacitors and the M second capacitors in the first connection state, so as to output an internal power supply voltage which is variable,
wherein said varying means of said DC-DC converter includes a comparator which generates an output pulse by comparing the internal power supply voltage and a reference voltage, and a switch having an ON/OFF state controlled by the output pulse and supplying the external power supply voltage to the N capacitors or to one of the N capacitors.

13. The storage apparatus as claimed in claim 12, wherein said storage section includes a head and a recording medium, and said DC-DC converter further comprises reference voltage generating means for generating a reference voltage which is different depending on a recording and/or reproducing position of the head on the recording medium.

14. The storage apparatus as claimed in claim 12, wherein said DC-DC converter further comprises reference voltage generating means for generating a reference voltage which is different depending on a data transfer rate of said internal circuit.

* * * * *